(12) United States Patent
Morrison

(10) Patent No.: US 11,095,728 B2
(45) Date of Patent: Aug. 17, 2021

(54) TECHNIQUES FOR AUTOMATICALLY INTERPRETING METRIC VALUES TO EVALUATE THE HEALTH OF A COMPUTER-BASED SERVICE

(71) Applicant: DISNEY ENTERPRISES, INC., Burbank, CA (US)

(72) Inventor: Vincent Morrison, Fountain Valley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 172 days.

(21) Appl. No.: 16/014,952

(22) Filed: Jun. 21, 2018

(65) Prior Publication Data

US 2019/0394283 A1 Dec. 26, 2019

(51) Int. Cl.
*G06F 15/173* (2006.01)
*H04L 29/08* (2006.01)
(Continued)

(52) U.S. Cl.
CPC ............. *H04L 67/16* (2013.01); *G06F 7/50* (2013.01); *G06N 20/00* (2019.01)

(58) Field of Classification Search
CPC ... H04L 41/0817; H04L 41/147; H04L 41/12; H04L 41/14; H04L 67/16; G06N 20/00; G06F 7/50
(Continued)

(56) References Cited

U.S. PATENT DOCUMENTS 5,923,849 A * 7/1999 Venkatraman ............ H04B 3/46
370/355
7,505,450 B2 * 3/2009 Castagnoli .......... H04L 41/0663
370/254
(Continued)

OTHER PUBLICATIONS

Calheiros et al., "On the effectiveness of isolation-based anomaly detection in cloud data centers", Sep. 16, 2016, Wiley, p. 1-12 (Year: 2016).*
(Continued)

*Primary Examiner* — Melvin H Pollack
(74) *Attorney, Agent, or Firm* — Artegis Law Group, LLP

(57) ABSTRACT

In various embodiments, a health evaluation application automatically monitors and evaluates the health of one or more computer-based services. The health evaluation application computes deviation values based on one or more machine-learned expected variations associated with multiple metrics. The metrics are associated with the computer-based service(s). The health evaluation application then performs classification operation(s) based on the deviation values and machine-learned classification criteria to compute anomaly indicators associated with a first service included in the one or more computer-based services. Subsequently, the health evaluation application computes a score that indicates the overall health of the first service based on the anomaly indicators. Advantageously, because the health evaluation application automatically computes the score, the time required to monitor and evaluate the health of the service is reduced compared to the time required to manually monitor and evaluate the health of the service.

23 Claims, 5 Drawing Sheets

(51) Int. Cl.
*G06F 7/50* (2006.01)
*G06N 20/00* (2019.01)

(58) Field of Classification Search
USPC .......................................................... 709/224
See application file for complete search history.

(56) References Cited

U.S. PATENT DOCUMENTS

| | | | | |
|---|---|---|---|---|
| 8,145,760 | B2* | 3/2012 | Dinda | G06F 9/4887 709/226 |
| 8,326,965 | B2* | 12/2012 | Grumann | G06F 11/34 709/224 |
| 8,341,106 | B1* | 12/2012 | Scolnicov | G06N 7/005 706/47 |
| 8,583,584 | B2* | 11/2013 | Ruhl | G06F 16/958 706/52 |
| 8,621,615 | B2* | 12/2013 | Zhao | H04L 43/00 370/252 |
| 8,626,889 | B2* | 1/2014 | Sharma | G06F 11/30 709/223 |
| 9,276,826 | B1* | 3/2016 | Dickson | H04L 49/00 |
| 9,317,574 | B1* | 4/2016 | Brisebois | G06F 21/62 |
| 9,356,839 | B2* | 5/2016 | White | H04L 41/145 |
| 9,569,330 | B2* | 2/2017 | Suit | G06F 11/3409 |
| 9,843,488 | B2* | 12/2017 | Balabine | H04L 43/04 |
| 9,866,954 | B2* | 1/2018 | Germain | H04R 3/00 |
| 10,033,602 | B1* | 7/2018 | Russell | H04L 43/06 |
| 10,127,125 | B2* | 11/2018 | Krishnan | G06F 11/0751 |
| 10,198,155 | B2* | 2/2019 | Maheshwari | H04L 41/5012 |
| 10,284,453 | B2* | 5/2019 | Bell | H04L 43/16 |
| 10,313,211 | B1* | 6/2019 | Rastogi | G06N 20/00 |
| 10,405,208 | B2* | 9/2019 | Ganapathi | H04L 41/0893 |
| 10,417,225 | B2* | 9/2019 | Tankersley | G06F 16/24528 |
| 10,452,511 | B2* | 10/2019 | Brooks | H04L 41/5009 |
| 10,462,034 | B2* | 10/2019 | Nageshappa | H04L 43/08 |
| 10,504,038 | B2* | 12/2019 | Franc | H04L 63/1425 |
| 10,505,825 | B1* | 12/2019 | Bettaiah | G06F 16/22 |
| 10,521,778 | B2* | 12/2019 | Bull | G06Q 20/405 |
| 10,536,353 | B2* | 1/2020 | Gupta | G06F 16/951 |
| 10,552,728 | B2* | 2/2020 | Oliner | G06F 40/274 |
| 10,552,763 | B2* | 2/2020 | Weibel | G06N 20/00 |
| 10,560,309 | B1* | 2/2020 | Chitalia | H04L 41/069 |
| 10,560,465 | B2* | 2/2020 | Ghare | H04L 43/028 |
| 10,565,599 | B2* | 2/2020 | Rodkey | G06Q 40/10 |
| 10,574,550 | B2* | 2/2020 | Brewster, Jr. | H04L 43/0817 |
| 10,581,886 | B1* | 3/2020 | Sharifi Mehr | H04L 63/1425 |
| 10,592,093 | B2* | 3/2020 | Sainani | H04L 41/5012 |
| 10,638,411 | B2* | 4/2020 | Stone | H04W 24/08 |
| 10,678,225 | B2* | 6/2020 | Kidd | G05B 19/41875 |
| 10,678,233 | B2* | 6/2020 | Celia | G06K 9/62 |
| 10,692,004 | B1* | 6/2020 | Segev | G06N 3/08 |
| 10,701,092 | B2* | 6/2020 | Sartran | H04L 63/1425 |
| 10,721,256 | B2* | 7/2020 | Urmanov | G06F 11/0793 |
| 10,742,486 | B2* | 8/2020 | Mermoud | H04L 41/0681 |
| 10,764,310 | B2* | 9/2020 | Vasseur | G06N 20/00 |
| 10,785,090 | B2* | 9/2020 | Vasseur | H04L 41/14 |
| 10,803,169 | B1* | 10/2020 | Flatten | G06N 20/00 |
| 2013/0086249 | A1* | 4/2013 | White | H04L 67/16 709/224 |
| 2013/0103453 | A1* | 4/2013 | Hoagland | G06Q 10/06 705/7.25 |
| 2016/0300126 | A1* | 10/2016 | Callan | H04L 43/04 726/22 |
| 2017/0279848 | A1* | 9/2017 | Vasseur | H04L 63/1425 |
| 2017/0310566 | A1* | 10/2017 | Aly Salama | H04L 63/1416 |
| 2018/0039555 | A1* | 2/2018 | Salunke | G06F 11/3409 |
| 2018/0337935 | A1* | 11/2018 | Marwah | H04L 63/1425 |
| 2018/0365090 | A1* | 12/2018 | Ben Simhon | G06K 9/6284 |
| 2019/0089618 | A1* | 3/2019 | Kludy | G06F 11/3006 |
| 2019/0102276 | A1* | 4/2019 | Dang | H04L 43/04 726/22 |
| 2019/0129821 | A1* | 5/2019 | Lee | H04L 41/5061 |
| 2019/0188065 | A1* | 6/2019 | Anghel | G06N 5/04 |
| 2019/0235906 | A1* | 8/2019 | Asawa | G06F 9/4875 |
| 2019/0317817 | A1* | 10/2019 | Brown | G06F 9/5088 |
| 2019/0340564 | A1* | 11/2019 | Holmquist | H04L 43/0876 |
| 2019/0356533 | A1* | 11/2019 | Vasseur | H04L 43/08 |
| 2019/0370610 | A1* | 12/2019 | Batoukov | G06F 11/0793 |
| 2019/0372827 | A1* | 12/2019 | Vasseur | H04L 41/147 |
| 2019/0386904 | A1* | 12/2019 | Srivatsan | H04L 41/0813 |
| 2019/0394283 | A1* | 12/2019 | Morrison | G06F 7/50 |
| 2020/0051419 | A1* | 2/2020 | Malaver | G06F 3/0484 |
| 2020/0106795 | A1* | 4/2020 | Servajean | G06N 20/00 |
| 2020/0358792 | A1* | 11/2020 | Bazalgette | G06N 5/04 |
| 2020/0358804 | A1* | 11/2020 | Crabtree | H04L 63/1416 |

OTHER PUBLICATIONS

Paschke, A. & Schnappinger-Gerull, E.,. A categorization scheme for SLA metrics. In: Wenkel, K.-O., Wagner, P. Morgenstern, M., Luzi, K. & Eisermann, P. (Hrsg.), Service-Oriented Electronic Commerce, Proceedings zur Konferenz im Rahmen der Multikonferenz Wirtschaftsinformatik 2006. pp. 25-40. (Year: 2006).*
H. Truong, R. Samborski and T. Fahringer, "Towards a Framework for Monitoring and Analyzing QoS Metrics of Grid Services," 2006 Second IEEE International Conference on e-Science and Grid Computing (e-Science'06), Amsterdam, The Netherlands, 2006, pp. 65-65, doi: 10.1109/E-SCIENCE.2006.261149. (Year: 2006).*
V. C. Emeakaroha, I. Brandic, M. Maurer and S. Dustdar, "Low level Metrics to High level SLAs-LoM2HiS framework: Bridging the gap between monitored metrics and SLA parameters in cloud environments," 2010 International Conference on High Performance Computing & Simulation, Caen, 2010, pp. 48-54. (Year: 2010).*
Iverson, David L. "Inductive System Health Monitoring with Statistical Metrics," NASA Ames Research Center/JANNAF, Jun. 17, 2005, pp. 1-9. (Year: 2005).*
Claudia Canali, Riccardo Lancellotti. "Detecting similarities in virtual machine behavior for cloud monitoring using smoothed histograms," Journal of Parallel and Distributed Computing, vol. 74, Issue 8, Aug. 2014, pp. 2757-2769 (Year: 2014).*
Rodrigo N. Calheiros et al. "On the effectiveness of isolation-based anomaly detection in cloud data centers" Concurrency and Computation: Practice and Experience, vol. 29, Issue 18, Sep. 25, 2017. (Year: 2017).*

* cited by examiner

TECHNIQUES FOR AUTOMATICALLY INTERPRETING METRIC VALUES TO EVALUATE THE HEALTH OF A COMPUTER-BASED SERVICE

BACKGROUND

Field of the Various Embodiments

Embodiments of the present invention relate generally to performance evaluation technology for monitoring and controlling the allocation of resources in a computer-based service.

Description of the Related Art

Ensuring that a service is available and performing as intended or "healthy" is an important aspect of providing an effective service. As referred to herein, a "service" executes on one or more devices capable of executing instructions to perform a function for any number of users. A service is typically distributed via a network architecture. To evaluate the health of a service, oftentimes a service provider monitors a variety of metrics associated with the service and, based on those metrics, attempts to determine whether the service is healthy. If, at any point in time, the service provider determines that the performance of the service is subpar, then the service provider can take measures to restore the health of the service. For example, a web service provider could monitor requests per second, memory utilization, disk space, etc. to evaluate the performance of the web service. If the web service provider were to determine that the performance of the web service was subpar based on the metrics, then the web service provider could adjust the amount of resources (e.g., increase the memory) allocated to the web service in an attempt to resolve the performance issues and restore the "health" of the service.

In one common approach used to monitor the health of a service on an ongoing basis, subject matter experts (SMEs) curate and interpret the metrics being used to evaluate the health of the service. A subject matter expert is typically a person that has substantial practical experience with the service. In this common approach, the SME first chooses a subset of metrics composed of different metrics that the SME believes are likely to be important indicators of the health of the service. The SME then designs dashboards that visually depict the values of the selected metrics in a manner that helps the SME determine when the overall health of the service becomes compromised. Subsequently, the SME monitors the values of the metrics via the dashboards and interprets those values in order to reach a conclusion regarding the health of the service.

One drawback of the above approach is that curating and interpreting the metrics is primarily a manual process that requires an SME that is familiar with each of the different metrics being monitored and evaluated. Further, oftentimes a given service is monitored using hundreds of different metrics that come from many different sources. Consequently, selecting the important metrics, designing the dashboards, and monitoring and interpreting the values of all of the different metrics depicted on the dashboards is usually tedious and quite time-consuming, irrespective of the expertise of the SME. Another drawback of the above approach is that curating and interpreting the different metrics oftentimes reflects the innate biases of the SME. For example, if the SME for a web service has previously experienced issues with the web service that involve database connections, then the SME is more likely to identify/interpret poor database connections as the cause of a service degradation and is less likely to consider other possible causes of the degradation.

As the foregoing illustrates, what is needed in the art are more effective techniques for monitoring and evaluating the health of a service.

SUMMARY

One embodiment of the present invention sets forth a computer-implemented method for automatically monitoring and evaluating the health of one or more computer-based services. The method includes computing deviation values based on one or more machine-learned expected variations associated with multiple metrics, where the metrics are associated with one or more computer-based services; performing one or more classification operations based on the deviation values and a first set of machine-learned classification criteria to compute anomaly indicators associated with a first service included in the one or more computer-based services; and computing a first score that indicates the overall health of the first service based on the anomaly indicators.

At least one technical advantage of the disclosed techniques relative to prior art solutions is that, with the disclosed techniques, a given network is monitored and evaluated in an automated fashion and reliable feedback regarding the health of a service is automatically provided. In that regard, unlike prior art approaches that involve manually curating and interpreting metric values, the disclosed techniques compute an overall health score based on metric values associated with a service, machine-learned expected variations associated with multiple metrics, and machine-learned classification criteria associated with the multiple metrics. Consequently, the time required to evaluate the health of a service via the disclosed techniques can be substantially reduced compared to prior art approaches. Further, because the disclosed techniques do not involve subjective interpretation, the disclosed techniques eliminate individual biases that can reduce the reliability of prior art approaches. These technical advantages provide one or more technological advancements over the prior art.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
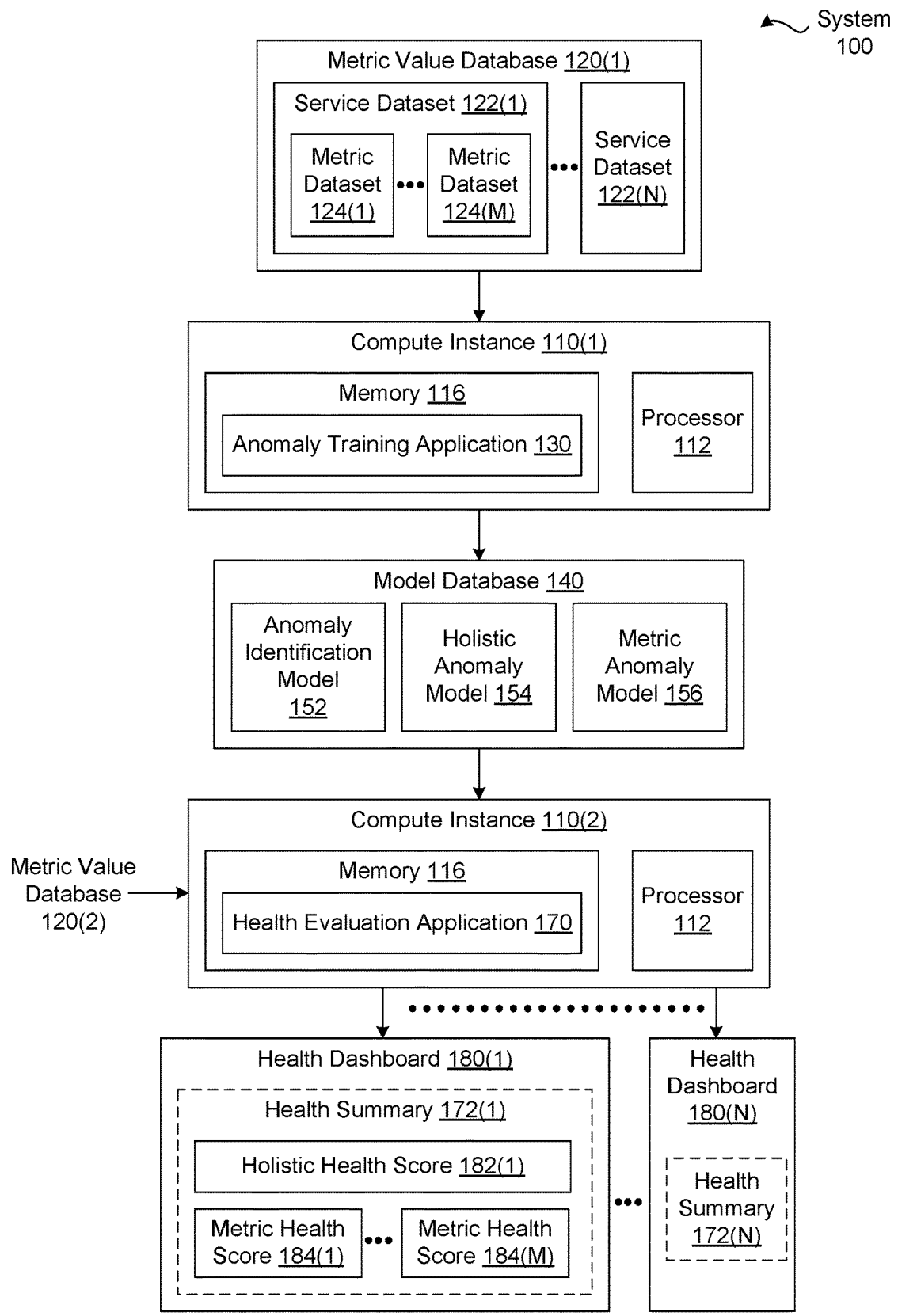
FIG. 1 is a conceptual illustration of a system configured to implement one or more aspects of the present invention.

FIG. 1 is a conceptual illustration of a system 100 configured to implement one or more aspects of the present invention. As shown, the system 100 includes, without limitation, two compute instances 110, two metric value databases 120, a model database 140, and any number of health dashboards 180. In alternate embodiments, the system 100 may include any number of compute instances 110 and any number of metric value databases 120. For explanatory purposes, multiple instances of like objects are denoted with reference numbers identifying the object and parenthetical numbers identifying the instance where needed. In various embodiments, any number of the components of the system 100 may be distributed across multiple geographic locations or included in one or more cloud computing environments (i.e., encapsulated shared resources, software, data, etc.) in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, each of the compute instances 110 is configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

In particular, the compute instance 110(2) is configured to evaluate the health of one or more services. As referred to herein, a "service" may be any type of application or other product that executes on any number of compute instances 110 to perform a function for any number of users. A service is typically distributed via a network architecture. For example, a service could allow a user to store data, manipulate data, communicate data, purchase merchandise, sell merchandise, view and/or stream videos, and so forth. Some non-limiting examples may include services provided using websites, mobile applications, video streaming platforms, video game platforms, etc. In general, the "health" of a service is a measurement of an availability and performance of the service. For example, a video service that is available and performing as intended is healthier than a video service that is available but performing in an unintended manner.

Ensuring that a service is healthy is an important aspect of providing an effective service. For this reason, a service provider typically monitors a variety of metrics associated with the service and, based on those metrics, attempts to determine whether the performance of the service is acceptable. If, at any point in time, the service provider determines that the performance of the service is unacceptable, then the service provider can take measures to restore the health of the service.

To evaluate the health of a service, a service provider conventionally enlists any number of SMEs (subject matter experts) to curate and interpret the metrics being used to evaluate the health of the service. As referred to herein, a subject matter expert is a person that has substantial practical experience with the service. In this conventional approach, the SME chooses a subset of the metrics composed of different metrics that the SME believes are likely to be important indicators of the health of the service. The SME then designs dashboards that visually depict the selected metrics in a manner that helps the SME evaluate the health of the service. As referred to herein, a "dashboard" may be any type of graphical user interface (GUI) or any portion of any type of GUI. Subsequently, the SME monitors the values of the metrics via the dashboards and manually interprets those values in order to determine the health of the service.

One drawback of using an SME to determine the health of a service is that curating and interpreting the metrics is primarily a manual process that typically requires an SME that is familiar with each of the different metrics being monitored and evaluated. Further, oftentimes a given service is monitored using hundreds of different metrics that come from many different sources. Consequently, selecting the important metrics, designing the dashboards, and monitoring and interpreting the values of all of the different metrics depicted on the dashboards is usually tedious and quite time-consuming, irrespective of the expertise of the SME. Another drawback of using an SME to determine the health of a service is that curating and interpreting the different metrics oftentimes reflects the innate biases of the SME.

Automatically Evaluating the Health of Computer-Based Services

To address the above problems, the system 100 includes, without limitation, an anomaly training application 130 and a health evaluation application 170. The anomaly training application 130 resides in the memory 116 and executes on the processor 112 of the compute instance 110(1). The health evaluation application 170 resides in the memory 116 and executes on the process 112 of the compute instance 110(2). In general, the anomaly training application 130 enables the health evaluation application 170 to automatically generate health summaries 172(1)-172(N) for N services based on M metrics, where N is greater than 0, and M is greater than 1. For explanatory purposes only, the number of metrics that are monitored for each of the N services is M. In alternate embodiments, the number and type of metrics that are monitored for a given service may vary from the number and type of metrics that are monitored for any number of the other services, and the techniques disclosed herein are modified accordingly.

The anomaly training application 130 implements machine learning techniques to generate a model database 140 based on a metric value database 120(1) that is associated with an initial training time period. Different instances of the metric value database 120 are associated with different time periods. For instance, the metric value database 120(2) is associated with a later time period that the metric value database 120(1). As shown for the metric value database 120(1), each of the metric value databases 120 includes, without limitation, service datasets 122(1)-122(N). Each service dataset 122 is associated with a different service and includes, without limitation, metric datasets 124(1)-124(M). Each metric dataset 124 includes, without limitation, any number of metric values for the associated metric, where each metric value is associated with a different timestamp. Each metric value may be associated with a timestamp in any technically feasible fashion. In alternate embodiments, the system 100 may organize and store metric values for the different metrics and services in any technically feasible fashion.

The system 100, the anomaly training application 130, and the health evaluation application 170 may acquire any number of metric value databases 120 in any technically feasible fashion and from any number of sources. For instance, in some embodiments, a data collection application (not shown) operates for thirteen weeks, polling a variety of data sources every minute to obtain the current metric values for each combination of the M metrics and the N services. In alternate embodiments, the metric value database 120(2) may be associated with X services and Y metrics, where X is not necessarily equal to N and Y is not necessarily equal to M, and the techniques described herein are modified accordingly.

After acquiring the metric value database 120(1), the anomaly training application 130 generates the model database 140. The model database 140 includes, without limitation, an anomaly identification model 152, a holistic anomaly model 154, and a metric anomaly model 156. The anomaly identification model 152 removes machine-learned expected variations associated with metrics from metric values to generate smoothed metric values. The anomaly identification model 152 enables the health evaluation application 170 to compute a deviation value for each metric value with respect to previously observed patterns of metric values.

The holistic anomaly model 154 implements one or more classification criteria associated with interdependencies between the metrics. The holistic anomaly model 154 enables the health evaluation application 170 to determine whether a given service is healthy at a given time step based on the deviation values associated with both the service and the time step across all the metrics. As referred to herein, the "holistic health" of a service is the overall health of the service.

By contrast, the metric anomaly model 156 implements one or more classification criteria associated with individual metrics. The metric anomaly model 156 enables the health evaluation application 170 to determine whether a given service is healthy with respect to a given metric at a given time step based on the deviation values associated with the combination of the service, the metric, and the time step. The anomaly training application 130 and the model database 140 are described in greater detail in conjunction with FIG. 2.

After acquiring the metric value database 120(2), the health evaluation application 170 computes health summaries 172(1)-172(N) based on the model database 140 and the metric value database 120(2). First, the health evaluation application 170 computes deviation values based on the metric value database 120(2) and the anomaly identification model 152. For each service, the health evaluation application 170 then computes an associated health summary 172. Each health summary 172 includes, without limitation, a holistic health score 182 and metric health scores 184(1)-184(M). Accordingly, the health evaluation application 170 computes N different holistic health scores 182 and (N*M) different metric health scores 184, where each metric health score 184 is associated with a different combination of a service and a metric.

To compute the holistic health score 182 associated with a given service, the health evaluation application 170 first generates a holistic anomaly dataset (not shown in FIG. 1) based on the holistic anomaly model 154 and the deviation values associated with the service. The holistic anomaly dataset includes, without limitation, any number of holistic anomaly indicators, where each holistic anomaly indicator indicates whether the combination of metric values associated with a particular time step is anomalous. A combination of metric values is referred to herein as "anomalous" when the combination of deviations associated with the metric values are determined by the holistic anomaly model 154 to be abnormal during proper operation of the associated service. For example, an anomaly can be a set of metric values that is typically not observed (i.e., rare occurrence) or that does not conform to expected patterns (i.e., an outlier relative to a trend fitted to the overall data set). A combination of metric values that is anomalous is also referred to herein as an anomaly.

As persons skilled in the art will recognize, the health of a service correlates to the number of anomalies associated with the metric values. Further, if a first anomaly occurred further in the past than a second anomaly, then the impact of the first anomaly on the current health of the service is typically less than the impact of the second anomaly on the current health of the service. For these reasons, the health evaluation application 170 performs any number of weighted averaging operations on the holistic anomaly dataset to compute the holistic health score 182 associated with the service. The holistic health score 182 indicates a degree of current overall health for the service in any technically feasible fashion. For example, a holistic health score 182 of 100% could indicate that the service is currently available and operating as intended. By contrast, a holistic health score 182 of 50% for a service could indicate that a current response rate associated with the service is 50%.

In a similar fashion, to compute the metric health score 184 associated with a given combination of service and metric, the health evaluation application 170 generates a metric anomaly dataset (not shown in FIG. 1) based on the metric anomaly model 156 and the deviations associated with the service. The holistic anomaly dataset includes, without limitation, any number of metric anomaly indicators, where each metric anomaly indicator indicates whether a particular metric value associated with a particular time step is anomalous. A metric value is referred to herein as "anomalous" when the deviation associated with the metric value is determined by the metric anomaly model 156 to be abnormal during proper operation of the associated service. A metric value that is anomalous is also referred to herein as an anomaly. The health evaluation application 170 then performs any number of weighted averaging operations on the metric anomaly dataset to compute the metric health score 184 associated with the combination of service and metric. The metric health score 184 may indicate a degree of current health for the associated service with respect to the associated metric in any technically feasible fashion.

Subsequently, the health evaluation application 170 generates the health dashboards 180(1)-180(N) based on, respectively, the health summaries 172(1)-172(N). Each of the health dashboards 180 may be any type of GUI or a portion of any type of GUI. The health evaluation application 170 may generate the health dashboard 172($x$) that depicts any portion of the health summary 172($x$) in any technically feasible fashion. For instance, in some embodiments and for a given service, the health evaluation application 170 generates the health dashboard 180 that highlights the holistic health score 182 associated with the service followed by the M metric health scores 184 associated with the service. In other embodiments, for a given service, the health evaluation application 170 selects the subset of the metric health scores 184 associated with the service that are below a configurable threshold. The health evaluation application 170 then orders the selected metric health scores 184 from lowest to highest. Finally, the health evaluation application 170 generates the health dashboard 180 that highlights the holistic health score 182 associated with the service followed by the ordered metric health scores 184.

In alternate embodiments, the health evaluation application 170 may generate any number and type of dashboards in any technically feasible fashion based on any number of the health summaries 172. In the same or other embodiments, the health evaluation application 170 may perform any number and type of actions based on the health summaries 172. For instance, in some embodiments, the health evaluation application 170 may compare the holistic health scores 182 to a critical threshold. If any of the holistic health scores 182 drop below the critical threshold, then the system 100 may initiate an action. For example, in one embodiment, the health evaluation application 170 may send an email to a specified network address, such as a specified troubleshooting station or supervisor. As another example, in various embodiments, the system 100 may send a signal to a server or other computing device to request or initiate a mitigating action by the server, such as a dedication of computing resources to the service.

Although not shown, the health evaluation application 170 subsequently re-computes the health summaries 172 based on new metric value databases 120(3)-120($x$)/As the health evaluation application 170 re-computes the health summaries 172, the health evaluation application 170 updates the health dashboards 180(1)-180(N) to reflect the new health summaries 172. In this fashion, the health evaluation application 170 continuously provides accurate health evaluation data to service providers. The health evaluation application 170 is described in greater detail in conjunction with FIG. 3.

In alternate embodiments, the health evaluation application 170 may acquire metric values for any number of metrics, any number of services, and any period of time in any technically feasible fashion and at any interval. For instance, in some embodiments, the health evaluation application 170 may acquire the metric value database 120($x$) that includes metric values that are associated with a first service. The health evaluation application 170 may then generate the health dashboard 180 associated with the first service based on the model database 140 and the metric value database 120($x$). Subsequently, the health evaluation application 170 may acquire the metric value database 120($y$) that includes metric values that are associated with a second service. The health evaluation application 170 may then generate the health dashboard 180 associated with the second service based on the model database 140 and the metric value database 120($y$).

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to computing a health of a service based, at least in part, on machine-learned expected variations and machine-learned classification criteria. For instance, in some embodiments, the anomaly training application 130 does not generate any metric models 156, and the anomaly identification model 152 and the holistic anomaly model 154 may be combined into a single anomaly model.

In alternate embodiments, the "health" of a service may be a measurement of any aspect of the service. For instance, in some embodiments, the health of a service is a measurement of change associated with the service. For example, if a new player skin for a video game was released, then the health of a service providing player skins for the video game could indicate the impact of releasing the new player skin on the player population associated with the video game. In another example, the health of a service could indicate the impact of releasing a feature for a website or mobile application. In yet another example, the health of a service could indicate the impact of releasing a set of content to a video streaming platform. In an additional example, the health of a service could indicate the impact of adding an additional device to a trusted network. In the same or other embodiments, the health evaluation application 170 may be replaced with a change evaluation application that generates a change dashboard that includes a holistic anomaly score and any number of metric anomaly score.

Figure 2:
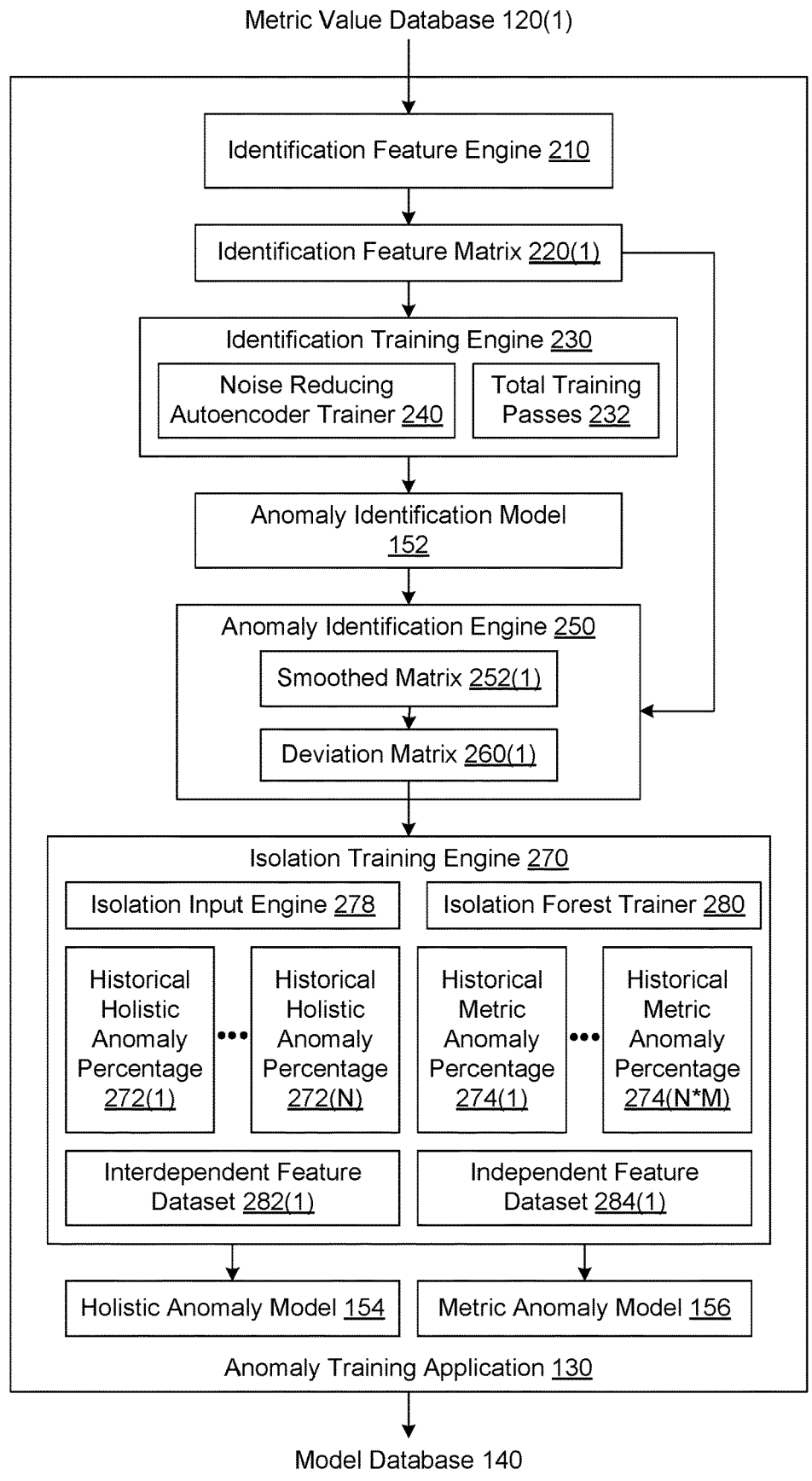
FIG. 2 is a more detailed illustration of the anomaly training application of FIG. 1, according to various embodiments of the present invention.

Training Models Used to Automatically Evaluate the Health of Computer-Based Services FIG. 2 is a more detailed illustration of the anomaly training application 130 of FIG. 1, according to various embodiments of the present invention. As shown, the anomaly training application 130 includes, without limitation, an identification feature engine 210, an identification feature matrix 220, an identification training engine 230, the anomaly identification model 152, an anomaly identification engine 250, an isolation training engine 270, the holistic anomaly model 154, and the metric anomaly model 156.

As shown, the identification feature engine 210 generates the identification feature matrix 220(1) based on the metric value database 120(1). The metric value database 120(1) includes, without limitation, any number of metric values. A given metric value included in the metric value database 120(1) is associated with one of the N services, one of the M metrics, and a timestamp. In general, the identification feature engine 210 performs any number and type of featurization operations to generate the identification feature matrix 220($x$) based on the metric value database 120($x$). As referred to herein, "featurization" is the process of converting properties of source data (e.g., the metric values) into numerical values that describe the properties.

Each row in the identification feature matrix 220 includes, without limitation, identifying information and the metric values associated with a different combination of the identifying information and a sliding window in time. The identifying information specifies both a service and a metric. The identification feature engine 210 may generate the identifying information in any technically feasible fashion. For instance, in some embodiments, the identification feature engine 210 performs one hot encoding operations to generate the identifying information for a given service and a given metric. In general, adjacent sliding windows are offset by the granularity of the metric value database 120(1). For example, suppose that the metric values were recorded at intervals of one second and the sliding window size were 800 minutes. One row in the identification feature matrix 220 could be associated with the sliding window from 1 minutes to 800 minutes and another row in the identification feature matrix 220 could be associated with the sliding window from 1 minute to 801 minutes.

The identification training engine 230 receives the identification feature matrix 220(1) and generates the anomaly identification model 152. As shown, the identification training engine 230 includes, without limitation, a noise reducing autoencoder trainer 240 and a total training passes 232. The noise reducing autoencoder trainer 240 performs any number of machine learning operations to train a noise reducing autoencoder using the identification feature matrix 220(1). The total training passes 232 specifies a total number of training passes that the noise reducing autoencoder trainer 240 performs to generate the anomaly identification model 152.

The noise reducing autoencoder trainer 240 may implement any number and type of machine learning techniques as known in the art. For instance, in some embodiments, after each training pass, the noise reducing autoencoder trainer 240 reorders the rows included in the identification feature matrix 220(1). When the number of training passes performed by the noise reducing autoencoder trainer 240 is equal to the total training passes 232, the trained noise reducing autoencoder is referred to herein as the anomaly identification model 152. As persons skilled in the art will recognize, the anomaly identification model 152 removes machine-learned expected variations from the identification feature matrix 220(x) to generate a smoothed matrix 252(x).

As shown, the anomaly identification engine 250(1) includes, without limitation, the smoothed matrix 252(1) and a deviation matrix 260(1). The anomaly identification engine 250(1) generates the smoothed matrix 252(1) based on the identification feature matrix 220(1) and the anomaly identification model 152. Subsequently, the anomaly identification engine 250(1) performs any number of subtraction operations between the identification feature matrix 220(1) and the smoothed matrix 252(1) to generate the deviation value matrix 260(1). Accordingly, the deviation matrix 260(1) includes, without limitation, any number of deviation values of the metric values included in the metric value database 120(1) with respect to previously observed patterns of metric values.

The isolation training engine 270 includes, without limitation, an isolation input engine 278, an interdependent feature dataset 282(1), an independent feature dataset 284(1), historical holistic anomaly percentages 272(1)-272(N), and historical metric anomaly percentages 274(1)-274(N*M). The isolation input engine 278 generates both the interdependent feature dataset 282(1) and the independent feature dataset 284(1) based on the deviation matrix 260(1). The interdependent feature dataset 282(1) includes, without limitation, interdependent inputs (not shown). Each interdependent input is associated with a different combination of a service and a timestamp. Each interdependent input includes, without limitation, a featurized service, and M deviation values (one deviation value associated with each metric) for the associated service at the associated timestamp. The featurized service numerically specifies the service associated with the interdependent input.

By contrast, the independent feature dataset 284(1) includes, without limitation, independent inputs (not shown) that are derived from the deviation matrix 260(1). Each independent input is associated with a different combination of a service, a timestamp, and a metric. Each independent input includes, without limitation, a featurized service, a featurized metric, and a deviation value for the combination of the associated service and the associated metric at the associated timestamp. The featurized service and the featurized metric numerically specify, respectively, the service and the metric associated with the independent input.

The isolation input engine 278 may derive the interdependent feature dataset 282 from the deviation matrix 260(1) in any technically feasible fashion that ensures that each deviation value is not duplicated within the interdependent feature dataset 282. Similarly, the isolation input engine 278 may derive the independent feature dataset 284(1) from the deviation matrix 260 in any technically feasible fashion that ensures that each deviation value is not duplicated within the independent feature dataset 284(1).

For instance, in some embodiments, to generate the interdependent input and the M independent inputs that are associated with a given timestamp and a given service, the isolation input engine 278 selects a sliding window of time that starts at the given timestamp. Subsequently, the isolation input engine 278 selects the M rows included in the deviation matrix 260 that are associated with both the sliding window and the service. The isolation input engine 278 orders the rows based on the associated metrics and aggregates the first deviation value included in each selected row based on an ordering associated with the metrics to generate the interdependent data. The isolation input engine 278 then performs one or more featurization operations based on the service to generate a featurized service. An example of a featurization operation is one hot encoding. The isolation input engine 278 aggregates the interdependent data and the featurized service to generate the interdependent input.

The isolation input engine 278 then generates M independent inputs based on the M selected rows. More specifically, for the selected row associated with a given metric, the isolation input engine 278 selects the first deviation value included in the selected row. The isolation input engine 278 then performs one or more featurization operations based on the metric to generate a featurized metric. Finally, the isolation input engine 278 aggregates the selected deviation value, the featurized service, and the featurized metric to generate the independent input associated with the service, the metric, and the timestamp.

Each of the historical holistic anomaly percentages 272 is associated with a different service and specifies a percentage of the combination of metric values associated with the service that are typically anomalous. Similarly, each of the historical metric anomaly percentages 274 is associated with a different combination of metric and a service. The historical metric anomaly percentage 274 associated both a given metric and a given service specifies a percentage of the metric values associated with both the metric and the service that are typically anomalous. In alternate embodiments, the isolation training engine 270 may implement any number and type of historical anomaly percentages. For instance, in some embodiments, the isolation training engine 270 may implement a single historical anomaly percentage.

The isolation training engine 270 may acquire the historical holistic anomaly percentages 272 and the historical metric anomaly percentages 274 in any technically feasible fashion. For instance, in some embodiments, the isolation training engine 270 may receive the historical holistic anomaly percentages 272 and the historical metric anomaly percentages 274 via a graphical user interface (not shown). In other embodiments, the isolation training engine 270 may compute the historical holistic anomaly percentages 272 and the historical metric anomaly percentages 274 based the percentage of minutes that the associated service(s) were operationally deficient during a specific time period. For example, suppose that for a total of 7 days during a 13 week (91 day) time period, a given service had verified operational problems. The isolation training engine 270 could set the historical holistic anomaly percentage 272 associated with the service equal to 7.8% ((7/91)×100).

In general, the isolation forest trainer 280 trains an isolation forest based on an input dataset to generate a trained model. In operation, the isolation forest trainer 280 trains a first isolation forest using the interdependent feature dataset 282 and the historical holistic anomaly percentages 272 to generate the holistic anomaly model 154. The isolation forest trainer 280 trains a second isolation forest using the independent feature dataset 284 and the historical metric anomaly percentages 274 to generate the metric anomaly model 156.

For each of the interdependent inputs included in the interdependent feature dataset 282(1), the isolation forest trainer 280 sequentially performs training operations on the first isolation forest using the interdependent input and the historical holistic anomaly percentage 272 associated with the interdependent input. For example, if a given interdependent input is associated with an xyz.com web service, then the isolation forest trainer 280 performs training operations on the first isolation forest based on the interdependent input and the historical holistic anomaly percentage 272 associated with xyz.com.

After the isolation forest trainer 280 performs training operations on the first isolation forest for each of the interdependent inputs included in the interdependent feature dataset 282(1), the resulting trained isolation forest is referred to herein as the holistic anomaly model 154. As persons skilled in the art will recognize, as a result of the training operations, the holistic anomaly model 154 implements any number of classification criteria associated with the services. In general, the holistic anomaly model 154 maps an interdependent input to a holistic anomaly indicator. The holistic anomaly indicator specifies whether the combination of metric values associated with the interdependent input is anomalous with respect to the system associated with the interdependent input. The holistic anomaly indicator may specify whether the combination of metric values is anomalous in any technically feasible fashion. For instance, in some embodiments, a holistic anomaly indicator of one indicates that the combination of metric values is anomalous. By contrast, a holistic anomaly indicator of negative one indicates that the combination of metric values is not anomalous.

For each of the independent inputs included in the independent feature dataset 284(1), the isolation forest trainer 280 sequentially performs training operations on a second isolation forest using the independent input and the historical metric anomaly percentage 274 associated with the independent input. For example, if a given independent input is associated with both an "memory utilization" metric and the xyz.com web service, then the isolation forest trainer 280 performs training operations on the second isolation forest based on the independent input and the historical metric anomaly percentage 274 associated with both memory utilization and xyz.com.

After the isolation forest trainer 280 performs training operations on the second isolation forest for each of the independent inputs included in the independent feature dataset 284(1), the resulting trained isolation forest is referred to herein as the metric anomaly model 156. As persons skilled in the art will recognize, as a result of the training operations, the metric anomaly model 156 implements any number of classification criteria associated with the metrics and the services. In general, the metric anomaly model 156 maps an independent input to a metric anomaly indicator. The metric anomaly indicator specifies whether the metric value associated with the independent input is anomalous with respect to the metric and service associated with the independent input. The metric anomaly indicator may specify whether the metric value is anomalous in any technically feasible fashion. For instance, in some embodiments, a metric anomaly indicator of one indicates that the metric values is anomalous. By contrast, a metric anomaly indicator of negative one indicates that the metric value is not anomalous.

Finally, the anomaly training application 130 stores the anomaly identification model 152, the holistic anomaly model 154 and the metric anomaly model 156 in the model database 140. The model database 140 may be any memory that is accessible by the health evaluation application 170. Advantageously, because the anomaly training application 130 performs training operations using metric values across multiple metrics and any number of services (both individually and combined), the models learn accurate information about the relationships between all the metrics and system health. Further, since the anomaly training application 130 automatically generates the model database 140, the model database 140 does not reflect any individual biases.

In alternate embodiments, the anomaly training application 130 may perform any number and type of machine learning operations to generate any number and type of models. For instance, in some embodiments, instead of training a noise reducing autoencoder, the anomaly training application 130 implements principal component analysis techniques and re-construction techniques to determine the expected variations used to generate the smoothed matrix 252(1). In such embodiments, the health evaluation application 170 is modified to operate based on the machine-learned expected variations instead of the anomaly identification model 152. In the same or other embodiments, the anomaly training application 130 may train any type of binary classifier instead of training an isolation forest. Examples of binary classifiers include, without limitation, random forests, one-class Support Vector Machines, and the like.

Automatically Computing Health Scores for
Computer-Based Services

Figure 3:
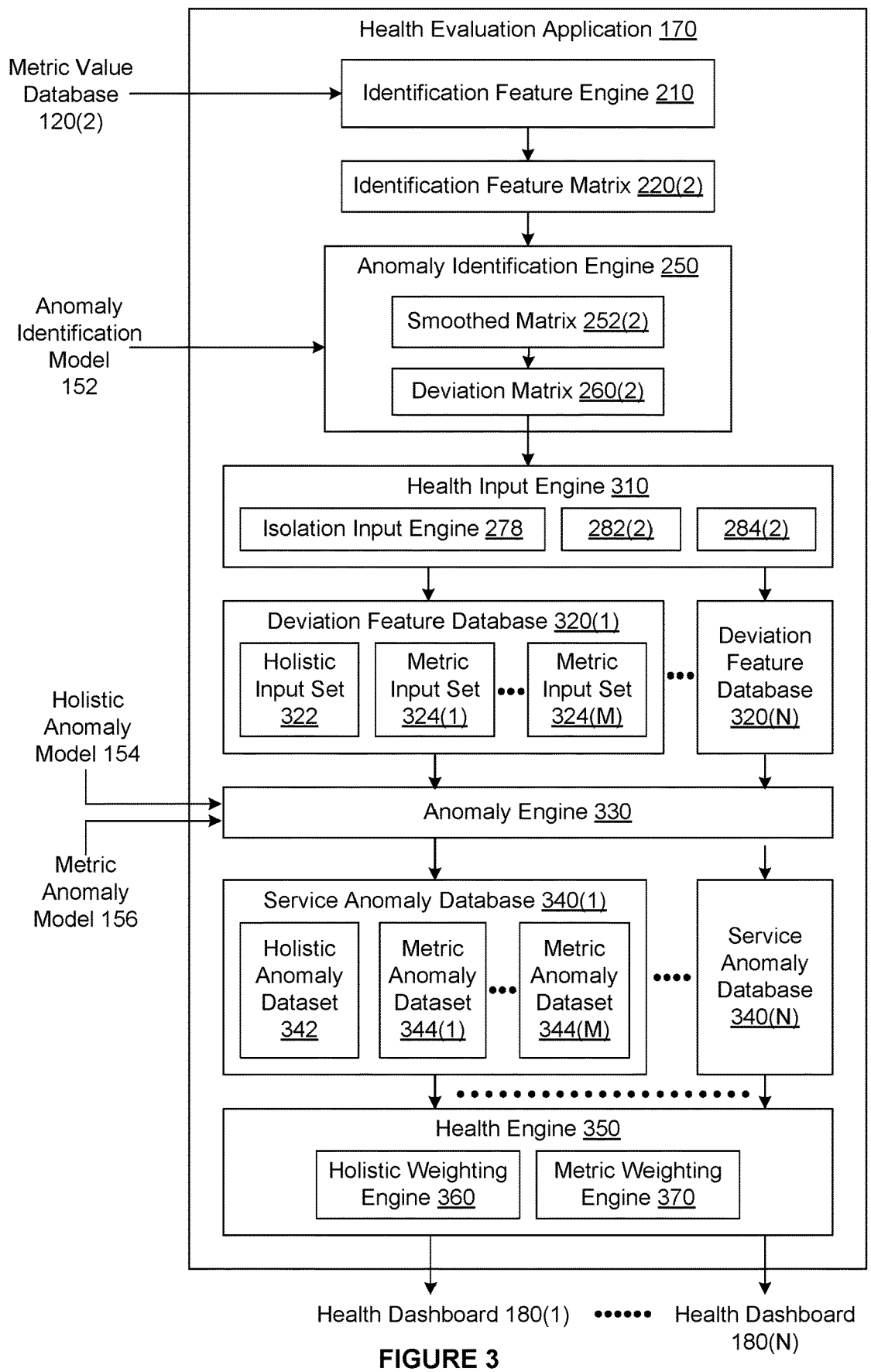
FIG. 3 is a more detailed illustration of the health evaluation application of FIG. 1, according to various embodiments of the present invention.

FIG. 3 is a more detailed illustration of the health evaluation application 170 of FIG. 1, according to various embodiments of the present invention. As shown, the health evaluation application 170 includes, without limitation, the identification feature engine 210, the identification feature matrix 220(2), the anomaly identification engine 250, a health input engine 310, deviation feature databases 320(1)-320(N), an anomaly engine 330, service anomaly databases 340(1)-340(N), and a health engine 350. Note that the identification feature engine 210, the identification feature matrix 220, and the anomaly identification engine 250 were described in detail previously herein in conjunction with FIG. 2.

As shown, the identification feature engine 210 generates the identification feature matrix 220(2) based on the metric value database 120(2). Subsequently, the anomaly identification engine 250 generates the smoothed matrix 252(2) based on the identification feature matrix 220(2) and the anomaly identification model 152. The anomaly identification engine 250 then generates the deviation matrix 260(2) based on the smoothed matrix 252(2) and the identification feature matrix 220(2).

The health input engine 310 includes, without limitation, the isolation input engine 278, the interdependent feature database 282(2) and the independent feature dataset 284(2). Note that the isolation input engine 278 was described in detail previously herein in conjunction with FIG. 2. The isolation input engine 278 generates the interdependent feature database 282(2) and the independent feature dataset 284(2) based on the deviation matrix 260(2). Subsequently, for each of the N services, the health input engine 310 generates an associated deviation feature database 320 based on the service, the interdependent feature database 282(2) and the independent feature dataset 284(2).

As shown, each of the deviation feature databases 320 includes, without limitation, a holistic input set 322 and metric input sets 324(1)-324(M). The holistic input set 322 included in the deviation feature database 320 associated with a given service is the holistic input set 322 associated with the service. Similarly, each of the metric input sets 324 included in the deviation feature database 320 associated with a given service is associated with both the service and a different metric.

To generate the holistic input set 322 associated with a given service, the health input engine 310 selects the set of the interdependent inputs included in the interdependent feature dataset 282(2) that are associated with the service. For example, for an xyz.com web service, the health input engine 310 selects the set of interdependent inputs included in the interdependent feature dataset 282(2) that are associated with xyz.com. The health input engine 310 then sets the holistic input set 322 equal to the set of selected interdependent inputs. To generate the metric input set 324 associated with both a given service and a given metric, the health input engine 310 selects the set of the independent inputs included in the independent feature dataset 284(2) that are associated with both the service and the metric. The health input engine 310 then sets the metric input set 324 equal to the set of selected independent inputs. In this fashion, the health input engine 310 distributes the interdependent inputs and the independent inputs between the N holistic input sets 322 and the (N*M) different metric input sets 324.

For each deviation feature database 320(x), the anomaly engine 330 generates the service anomaly database 340(x) based on the holistic anomaly model 154 and the metric anomaly model 156. As shown, each of the service anomaly databases 340 includes without limitation, a holistic anomaly dataset 342 and metric anomaly datasets 344(1)-344(M). Although not shown, each of the holistic anomaly datasets 342 includes, without limitation, any number of holistic anomaly indicators. Similarly, each of the metric anomaly datasets 344 includes, without limitation, any number of metric anomaly indicators. Note that, as described in detail previously herein in conjunction with FIG. 2, the holistic anomaly model 154 maps an interdependent input to an anomaly indicator. Similarly, the metric anomaly model 156 maps an independent input to a metric anomaly indicator.

To generate the holistic anomaly dataset 342 included in the service anomaly database 340(x), the anomaly engine 330 selects the holistic input set 322 included in the deviation feature database 320(x). The anomaly engine 330 then maps each of the interdependent inputs included in the selected holistic input set 322 to a different holistic anomaly indicator using the holistic anomaly model 154. The anomaly engine 330 includes the resulting holistic anomaly indicators in the holistic anomaly dataset 342 included in the service anomaly database 340(x).

To generate the metric anomaly dataset 344(y) included in the service anomaly database 340(x), the anomaly engine 330 selects the metric input set 324(y) included in the deviation feature database 320(x). The anomaly engine 330 then maps each of the independent inputs included in the selected metric input set 324 to a different metric anomaly indicator using the metric anomaly model 156. The anomaly engine 330 includes the resulting metric anomaly indicators in the metric anomaly dataset 344(y) included in the service anomaly database 340(x).

Notably, each of the interdependent inputs included in a given holistic input set 322 is associated with a different timestamp. Consequently, each of the holistic anomaly indicators included in a given holistic anomaly dataset 342 is associated with a different timestamp. In an analogous fashion, each of the independent inputs included in a given metric input set 324 is associated with a different timestamp. Consequently, each of the metric anomaly indicators included in a given metric anomaly dataset 344 is associated with a different timestamp.

As shown, for each service, the health engine 350 generates the health dashboard 180(x) that includes, without limitation, any portion of the health summary 172(x). As described in detail previously herein in conjunction with FIG. 1, each health summary 172 includes, without limitation, a different holistic health score 182 and different metric health scores 184(1)-184(M). The health engine 350 includes, without limitation, a holistic weighting engine 360 and a metric weighting engine 370. In general, the holistic weighting engine 360 performs weighted averaging operations on the holistic health indicators included in a given holistic anomaly dataset 342 to compute the associated holistic health score 182. The metric weighting engine 370 performs weighted averaging operations on the metric anomaly indicators included in a given metric anomaly dataset 344 to compute the associated metric health score 184.

To generate the health summary 172(x), the health engine 180 first selects the holistic anomaly dataset 342 included in the service anomaly database 340(x). The holistic weighting engine 360 then computes the holistic health score 182 based on the selected holistic anomaly dataset 342. Notably, as persons skilled in the art will recognize, the health of a service correlates to the number of anomalies associated with the metrics. Further, if a first anomaly occurred further in the past than a second anomaly, then the impact of the first anomaly on the health of the service is typically less than the impact of the second anomaly on the health of the service.

For these reasons, to compute the holistic health score 182, the holistic weighting engine 360 performs any number of weighted averaging operations on the selected holistic anomaly dataset 342, where the weight associated with each holistic anomaly indicator reflects the associated timestamp.

For example, suppose that the selected holistic anomaly dataset 342 included 60 holistic anomaly indicators, the 6 most recent holistic anomaly indicators were 1 (indicating an anomaly), and the remaining holistic anomaly indicators were −1 (indicating no anomaly). The holistic weighting engine 360 could set the holistic health score 182 to 90%. By contrast, suppose that the selected holistic anomaly dataset 342 included 60 holistic anomaly indicators, the 6 least recent holistic anomaly indicators were 1 (indicating an anomaly), and the remaining holistic anomaly indicators were −1 (indicating no anomaly). The holistic weighting engine 360 could set the holistic health score 182 to 98%.

To generate the metric health score 184($y$) included in the health summary 172($x$), the health engine 180 first selects the metric anomaly dataset 344($y$) included in the service anomaly database 340($x$). The metric weighting engine 370 then computes the metric health score 182 based on the selected metric anomaly dataset 344. As persons skilled in the art will recognize, the health of a service with respect to a metric typically correlates to the standard deviation of the anomaly which, in turn, correlates to the deviation value associated with the anomaly. Accordingly, to compute the metric health score 184($y$), the metric weighting engine 370 performs any number of weighted averaging operations on the selected metric anomaly dataset 344, where the weight associated with each metric anomaly indicator reflects both the associated timestamp and the associated deviation value.

The holistic weighting engine 360 and the metric weighting engine 370 may perform the weighted averaging operations in any technically feasible fashion. In alternate embodiments, the holistic weighting engine 360 may generate each holistic health score 182 based on at least the holistic health indicators included in the associated holistic anomaly dataset 342 in any technically feasible fashion. In the same or other embodiments, the metric weighting engine 370 may generate each metric health score 184 based on at least the metric health indicators included in the associated metric anomaly dataset 344 in any technically feasible fashion.

Subsequently, the health engine 350 generates the health dashboards 180(1)-180(N) based on, respectively, the health summaries 172(1)-172(N). The health engine 350 may generate the health dashboard 180($x$) that depicts any portion of the health summary 172($x$) in any technically feasible fashion. For instance, in some embodiments and for a given service, the health engine 350 orders the metric health scores 184 associated with the service from lowest to highest. The health engine then generates the health dashboard 180 that highlights the holistic health score 182 associated with the service followed by the ordered metric health scores 184.

Figure 4A:
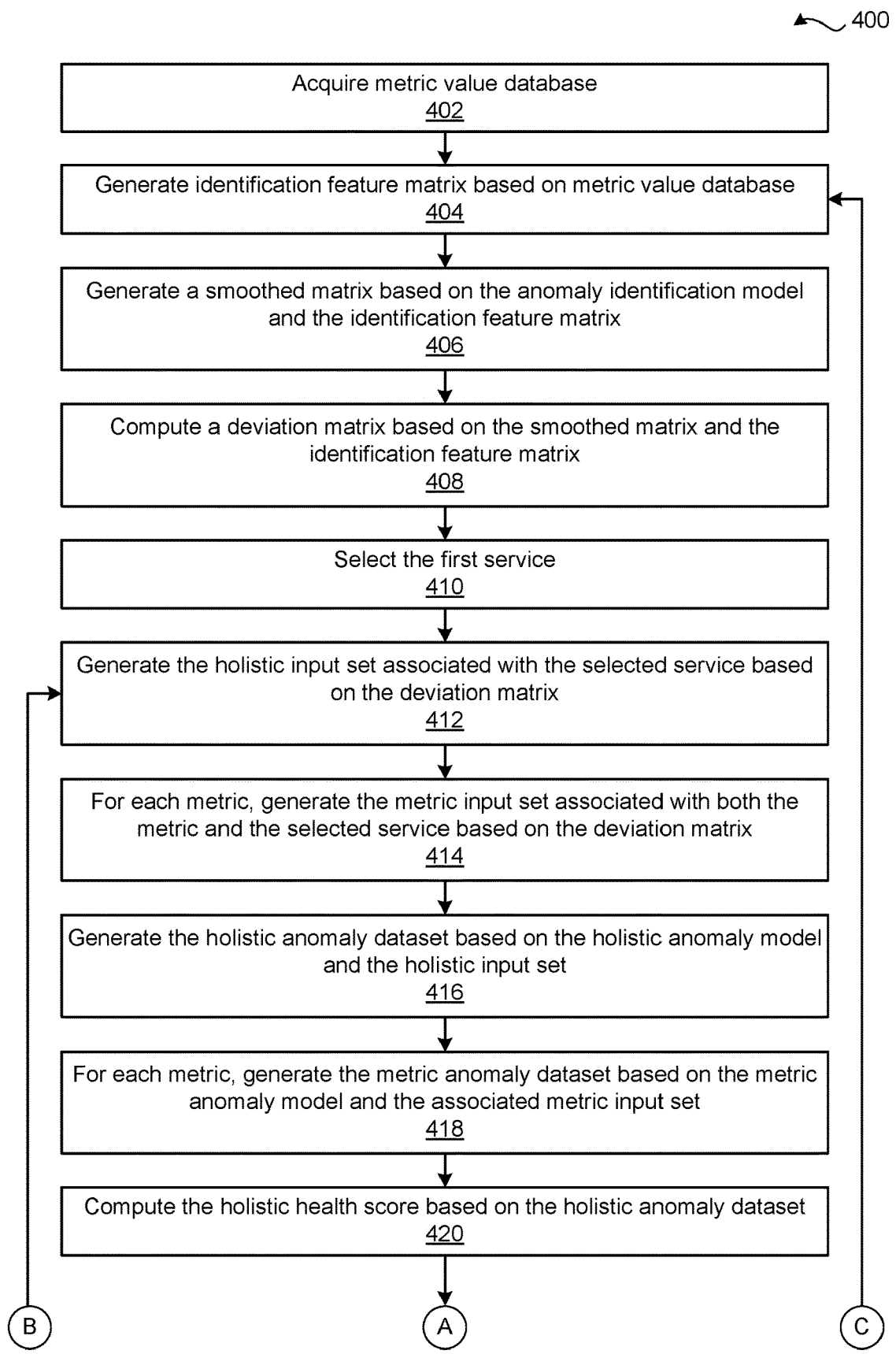
FIGS. 4A-4B set forth a flow diagram of method steps for automatically monitoring and evaluating the health of one or more computer-based services, according to various embodiments of the present invention.
Figure 4B:
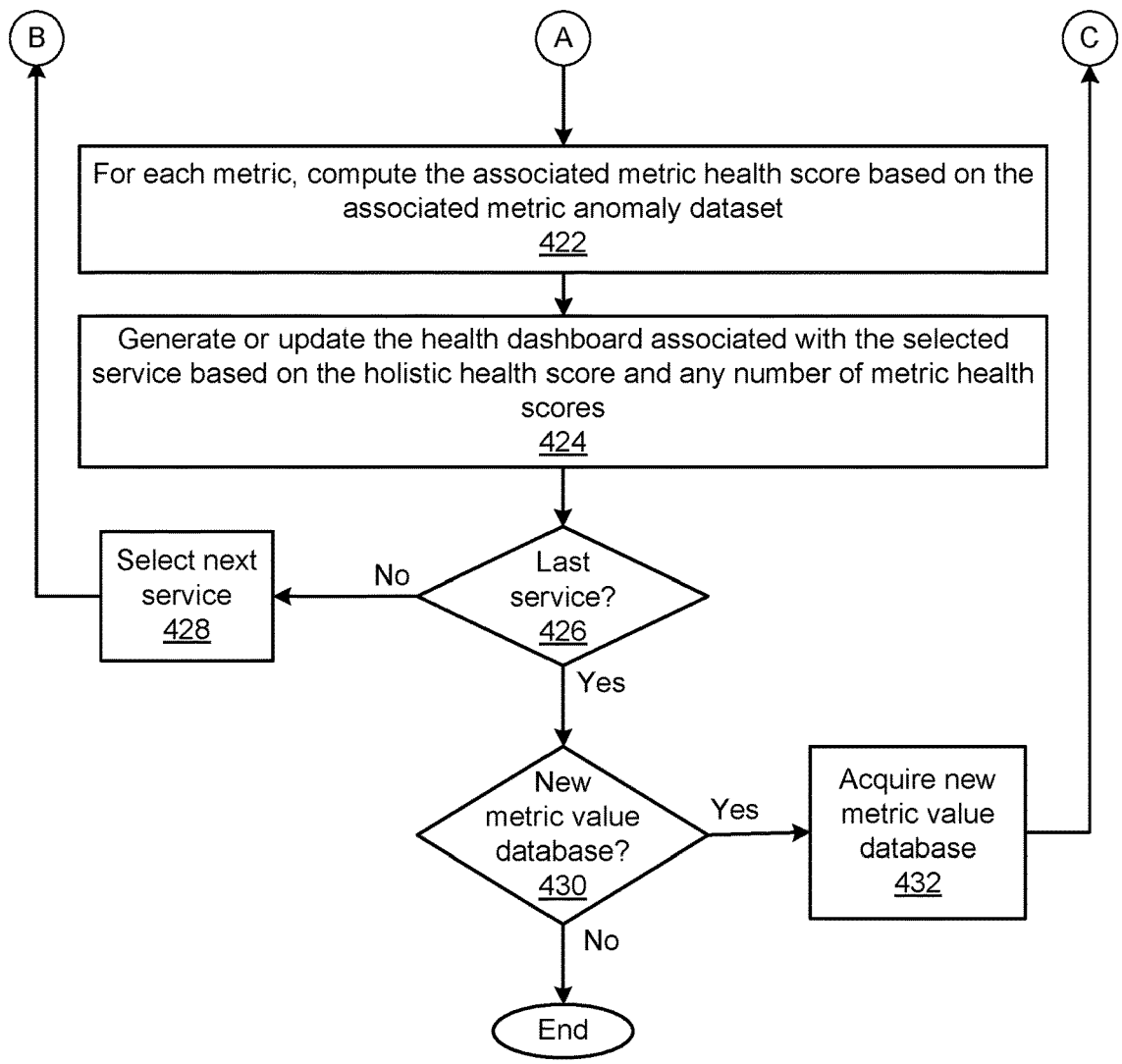

FIGS. 4A-4B set forth a flow diagram of method steps for automatically monitoring and evaluating the health of one or more computer-based services, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 402, where the health evaluation application 170 acquires the metric value database 120. At step 404, the identification feature engine 210 generates the identification feature matrix 220 based on the metric value database 120. At step 406, the anomaly identification engine 250 generates the smoothed matrix 252 based on the anomaly identification model 152 and the identification feature matrix 220. At step 408, the anomaly identification engine 250 computes the deviation matrix 260 based on the smoothed matrix 252 and the identification feature matrix 220.

At step 410, the health evaluation application 170 selects the first service. At step 412, the health input engine 310 generates the holistic input set 322 associated with the selected service based on the deviation matrix 260. At step 414, for each metric, the health input engine 310 generates the metric input set 324 associated with both the metric and the selected service based on the deviation matrix 260. At step 416, the anomaly engine 330 generates the holistic anomaly dataset 342 based on the holistic anomaly model 154 and the holistic input set 322. At step 418, for each metric, the anomaly engine 330 generates the metric anomaly dataset 344 based on the metric anomaly model 156 and the associated metric input set 324.

At step 420, the holistic weighting engine 360 computes the holistic health score 182 based on the holistic anomaly dataset 342. At step 422, for each metric, the metric weighting engine 370 computes the associated metric health score 184 based on the associated metric anomaly dataset 344. At step 424, the health engine 350 generates or updates the health dashboard 180 associated with the selected service based on the holistic health score 182 and any number of the metric health scores 184. In various embodiments, the health engine 350 can further initiate a mitigating action based on the holistic health score 182 and/or the any number of the metric health scores 184. In various embodiments, the mitigating action may be an allocation of computing resources to the service. In various embodiments, the allocation of computing resources may be a specified computing operation associated with one or more metric health scores of health scores 184 that are below a predetermined threshold. For example, if a health score associated with the network latency of a particular network session is below an 'unhealthy' threshold, then the health engine 350 can limit the number of devices added to the session. As another example, if the health score associated with the amount of memory required for the service is 'unhealthy', then the health engine 350 can request or allocate additional memory to the service, or terminate certain program operations. At step 426, the health evaluation application 170 determines whether the selected service is the last service. If, at step 426, the health evaluation application 170 determines that the selected service is not the last service, then the method 400 proceeds to step 428. At step 428, the health evaluation application 170 selects the next service. The method 400 then returns to step 412, where the health evaluation application 170 generates the holistic input set 322 associated with the newly selected service.

If, however, at step 426, the health evaluation application 170 determines that the selected service is the last service, then the method 400 proceeds directly to step 430. At step 430, the health evaluation application 170 determines whether a new metric value database 120 is available. If, at step 430, the health evaluation application 170 determines that a new metric value database 120 is available, then the method 400 proceeds to step 432. At step 432, the health evaluation application 170 acquires the new metric value database 120. The method 400 then returns to step 404, where the identification feature engine 210 generates a new identification feature matrix 220 based on the new metric value database 120. If, however, at step 430, the health evaluation application 170 determines that a new metric value database 120 is not available, then the method 400 terminates.

In sum, the disclosed techniques may be used to automatically monitor and evaluate the health of any number of services. In a training phase, an anomaly training application performs machine learning operations to generate three different models based on a first metric value database that includes a plurality of metric values for a plurality of metrics across any number of services and any number of timestamps. An anomaly identification model removes expected variations from metric values. A holistic anomaly model generates a holistic anomaly indicator based on a combination of deviation values, where each deviation value is associated with a different metric. The holistic anomaly indicator indicates whether the combination of metric values associated with the combination of deviation values is anomalous with respect to the associated service. A metric anomaly model generates a metric anomaly indicator based on a deviation value associated with a single metric value. The metric anomaly indicator indicates whether the metric value is anomalous with respect to both the associated metric and the associated service.

In an evaluation phase, for a given service, a health evaluation application generates a health dashboard based on a second metric value database that includes a plurality of metric values for the plurality of metrics across the services and any number of timestamps. First, the health evaluation application generates smoothed metric values based on the anomaly identification model and the second metric value database. The health evaluation application then computes deviation values based on the smoothed metric values and the metric values included in the second metric value database. For each timestamp, the health evaluation application generates an associated holistic anomaly indicator based on the holistic anomaly model and the combination of deviation values associated with both the service and the timestamp. In addition, for each metric value associated with the service, the health evaluation application generates an associated metric anomaly indicator based on the metric anomaly model and the deviation value associated with the metric value.

Subsequently, the health evaluation application computes a holistic health score based on the holistic anomaly indicators. And, for each metric, the health evaluation computes an associated metric health score based on the associated metric health indicators. Finally, the health evaluation application generates a health dashboard associated with the service. The health dashboard depicts the holistic health score and a prioritized list of any number of the metric health scores. In various embodiments, the health evaluation application may generate any number of dashboards associated with any number of services included in the plurality of services based on the anomaly identification model, the holistic anomaly model, and the metric anomaly model.

At least one technical advantage of the disclosed techniques relative to prior art solutions is that the disclosed techniques automatically provide reliable feedback regarding the health of any number of services. Unlike prior art approaches that rely on a subject matter expert (SME) to manually curate and interpret metric values, the disclosed techniques train machine learning models to determine and classify anomalies based on metric values. Notably, the anomaly training application trains different models based on multiple metrics (both individually and combined) and across any number of services. Because anomalies correlate to the health of services, the trained models accurately predict the impact of different metric values for different metrics and combinations of metrics on different aspects of health for the services. In particular, because the disclosed techniques do not rely on an SME, the disclosed techniques eliminate individual biases that can reduce the reliability of prior art approaches. Further, because the health evaluation application automatically generates a user-friendly health dashboard for each service, the time required to evaluate the health of each service is substantially reduced compared to prior art approaches. These technical advantages provide one or more technological advancements over the prior art.

1. In some embodiments, a computer-implemented method comprises computing a first plurality of deviation values based on one or more machine-learned expected variations associated with a plurality of metrics, wherein the plurality of metrics is associated with one or more computer-based services; performing one or more classification operations based on the first plurality of deviation values and a first set of machine-learned classification criteria to compute a first plurality of anomaly indicators associated with a first service included in the one or more computer-based services; and computing a first score that indicates the overall health of the first service based on the first plurality of anomaly indicators.

2. The computer-implemented method of clause 1, wherein computing the first plurality of deviation values comprises generating a first identification feature matrix based a plurality of metric values stored in a metric value database; generating a smoothed matrix based on the first identification feature matrix and an anomaly identification model that includes a mapping from the first identification feature matrix to the smoothed matrix based on the one or more machine-learned expected variations; and performing one or more subtraction operations between the first identification feature matrix and the smoothed matrix to generate the first plurality of deviation values.

3. The computer-implemented method of clauses 1 or 2, wherein the anomaly identification model comprises a trained noise reducing autoencoder.

4. The computer-implemented method of any of clauses 1-3, wherein performing the one or more classification operations comprises generating a first plurality of interdependent inputs based on the first plurality of deviation values, wherein each interdependent input is associated with the first service and each metric included in the plurality of metrics; and for each interdependent input included in the first plurality of interdependent inputs, generating a different anomaly indicator included in the first plurality of anomaly indicators based on an anomaly model, wherein the anomaly model includes a mapping of the interdependent input to the different anomaly indicator that is based on the first set of machine-learned classification criteria.

5. The computer-implemented method of any of clauses 1-4, wherein the anomaly model comprises a trained isolation forest.

6. The computer-implemented method of any of clauses 1-5, wherein generating the first score comprises performing one or more weighted averaging operations on the first plurality of anomaly indicators.

7. The computer-implemented method of any of clauses 1-6, further comprising performing one or more classification operations based on the first plurality of deviation values, a first metric included in the plurality of metrics, and a second set of machine-learned classification criteria to compute a second plurality of anomaly indicators associated with the first service; and computing a second score that indicates a health of the first service with respect to the first metric based on the second plurality of anomaly indicators.

8. The computer-implemented method of any of clauses 1-7, further comprising generating a first plurality of independent inputs based on the plurality of deviation values, wherein each independent input is associated with the first service and a first metric included in the plurality of metrics; for each interdependent input included in the first plurality of interdependent inputs, generating a different anomaly indicator included in a second plurality of anomaly indicators based on an anomaly model, wherein the anomaly model includes a mapping of the independent input to the different anomaly indicator that is based on a second set of machine-learned classification criteria; and computing a second score that indicates a health of the first service with respect to the first metric based on the second plurality of anomaly indicators.

9. The computer-implemented method of any of clauses 1-8, wherein the anomaly model comprises a trained isolation forest.

10. The computer-implemented method of any of clauses 1-9, further comprising performing one or more classification operations based on the first plurality of deviation values and the first set of machine-learned classification criteria to compute a second plurality of anomaly indicators associated with a second service included in the one or more computer-based services; and computing a second score that indicates the overall health of the second service based on the second plurality of anomaly indicators.

11. The computer-implemented method of any of clauses 1-10, further comprising automating a mitigating action based on the first score.

12. The computer implemented method of any of clauses 1-11, wherein the mitigating action is an allocation of computing resources to the one or more computer-based services.

13. The computer implemented method of any of clauses 1-12, wherein the mitigating action is a computing operation associated with a second score.

14. In some embodiments, a computer-readable storage medium includes instructions that, when executed by a processor, cause the processor to perform the steps of computing a first plurality of deviation values based on one or more machine-learned expected variations associated with a plurality of metrics, wherein the plurality of metrics is associated with one or more computer-based services; performing one or more classification operations based on the first plurality of deviation values and a first set of machine-learned classification criteria to compute a first plurality of anomaly indicators associated with a first service included in the one or more computer-based services; and computing a first score that indicates the overall health of the first service based on the first plurality of anomaly indicators.

15. The computer-readable storage medium of clause 14, wherein computing the first plurality of deviation values comprises generating a first identification feature matrix based a plurality of metric values stored in a metric value database; generating a smoothed matrix based on the first identification feature matrix and an anomaly identification model that includes a mapping from the first identification feature matrix to the smoothed matrix based on the one or more machine-learned expected variations; and performing one or more subtraction operations between the first identification feature matrix and the smoothed matrix to generate the first plurality of deviation values.

16. The computer-readable storage medium of clauses 14 or 15, further comprising training a noise reducing autoencoder using a second identification feature matrix associated with the one or more computer-based services to generate the anomaly identification model.

17. The computer-readable storage medium of any of clauses 14-16, wherein performing the one or more classification operations comprises generating a first plurality of interdependent inputs based on the first plurality of deviation values, wherein each interdependent input is associated with the first service and each metric included in the plurality of metrics; and for each interdependent input included in the first plurality of interdependent inputs, generating a different anomaly indicator included in the first plurality of anomaly indicators based on an anomaly model, wherein the anomaly model includes a mapping of the interdependent input to the different anomaly indicator that is based on the first set of machine-learned classification criteria.

18. The computer-readable storage medium of any of clauses 14-17, further comprising training an isolation forest using at least a second plurality of interdependent inputs and at least one expected percentage of anomalies to generate the anomaly model.

19. The computer-readable storage medium of any of clauses 14-18, wherein generating the first score comprises performing one or more weighted averaging operations on the first plurality of anomaly indicators.

20. The computer-readable storage medium of any of clauses 14-19, further comprising generating a first plurality of independent inputs based on the plurality of deviation values, wherein each independent input is associated with the first service and a first metric included in the plurality of metrics; for each interdependent input included in the first plurality of interdependent inputs, generating a different anomaly indicator included in a second plurality of anomaly indicators based on an anomaly model, wherein the anomaly model includes a mapping of the independent input to the different anomaly indicator that is based on a second set of machine-learned classification criteria; and computing a second score that indicates a health of the first service with respect to the first metric based on the second plurality of anomaly indicators.

21. The computer-readable storage medium of any of clauses 14-20, further comprising training an isolation forest using at least a second plurality of independent inputs associated with the first metric and a third plurality of independent inputs associated with a second metric included in the plurality of metrics to generate the anomaly model.

22. The computer-readable storage medium of any of clauses 14-21, further comprising generating a graphical user interface that depicts the first score and a plurality of metric health scores associated with the plurality of metrics.

23. In some embodiments, a system comprises a memory storing instructions; and a processor that is coupled to the memory and, when executing the instructions, is configured to compute a first plurality of deviation values based on one or more machine-learned expected variations associated with a plurality of metrics, wherein the plurality of metrics is associated with one or more computer-based services; perform one or more classification operations based on the first plurality of deviation values and a first set of machine-learned classification criteria to compute a first plurality of anomaly indicators associated with a first service included in the one or more computer-based services; and compute a first score that indicates the overall health of the first service based on the first plurality of anomaly indicators.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   computing a first plurality of deviation values based on one or more machine-learned expected variations associated with a plurality of metrics, wherein the plurality of metrics is associated with a first service, and the one or more machine-learned expected variations are derived from one or more models trained via one or more machine learning operations;
   performing one or more classification operations based on the first plurality of deviation values and a first set of machine-learned classification criteria to compute a first plurality of anomaly indicators associated with the first service; and
   computing a first score that indicates the overall health of the first service based on the first plurality of anomaly indicators.

2. The computer-implemented method of claim 1, wherein computing the first plurality of deviation values comprises:
   generating a first identification feature matrix based on a plurality of metric values stored in a metric value database;
   generating a smoothed matrix based on the first identification feature matrix and an anomaly identification model that includes a mapping from the first identification feature matrix to the smoothed matrix based on the one or more machine-learned expected variations; and
   performing one or more subtraction operations between the first identification feature matrix and the smoothed matrix to generate the first plurality of deviation values.

3. The computer-implemented method of claim 2, wherein the anomaly identification model comprises a trained noise reducing autoencoder.

4. The computer-implemented method of claim 1, wherein performing the one or more classification operations comprises:
   generating a first plurality of interdependent inputs based on the first plurality of deviation values, wherein each interdependent input is associated with the first service and a plurality of metric values for multiple metric included in the plurality of metrics; and for each interdependent input included in the first plurality of interdependent inputs, generating a different anomaly indicator included in the first plurality of anomaly indicators based on an anomaly model, wherein the anomaly model is based on the first set of machine-learned classification criteria associated with interdependencies between the multiple metrics.

5. The computer-implemented method of claim 4, wherein the anomaly model comprises a trained isolation forest.

6. The computer-implemented method of claim 1, wherein generating the first score comprises performing one or more weighted averaging operations on the first plurality of anomaly indicators.

7. The computer-implemented method of claim 1, further comprising:
performing one or more classification operations based on the first plurality of deviation values, a first metric included in the plurality of metrics, and a second set of machine-learned classification criteria to compute a second plurality of anomaly indicators associated with the first service; and
computing a second score that indicates a health of the first service with respect to the first metric based on the second plurality of anomaly indicators.

8. The computer-implemented method of claim 1, further comprising:
generating a first plurality of independent inputs based on the plurality of deviation values, wherein each independent input is associated with the first service and a first metric included in the plurality of metrics;
for each independent input included in the first plurality of independent inputs, generating a different anomaly indicator included in a second plurality of anomaly indicators based on an anomaly model, wherein the anomaly model includes a mapping of the independent input to the different anomaly indicator that is based on a second set of machine-learned classification criteria; and
computing a second score that indicates a health of the first service with respect to the first metric based on the second plurality of anomaly indicators.

9. The computer-implemented method of claim 8, wherein the anomaly model comprises a trained isolation forest.

10. The computer-implemented method of claim 1, further comprising:
performing one or more classification operations based on the first plurality of deviation values and the first set of machine-learned classification criteria to compute a second plurality of anomaly indicators associated with a second service; and
computing a second score that indicates the overall health of the second service based on the second plurality of anomaly indicators.

11. The computer-implemented method of claim 1, further comprising automating a mitigating action based on the first score.

12. The computer implemented method of claim 11, wherein the mitigating action is an allocation of computing resources to one or more computer-based services.

13. The computer implemented method of claim 11, wherein the mitigating action is a computing operation associated with a second score.

14. One or more non-transitory computer-readable storage media including instructions that, when executed by one or more processors, cause the one or more processors to perform the steps of:
computing a first plurality of deviation values based on one or more machine-learned expected variations associated with a plurality of metrics, wherein the plurality of metrics is associated with a first service, and the one or more machine-learned expected variations are derived from one or more models trained via one or more machine learning operations;
performing one or more classification operations based on the first plurality of deviation values and a first set of machine-learned classification criteria to compute a first plurality of anomaly indicators associated with the first service; and
computing a first score that indicates the overall health of the first service based on the first plurality of anomaly indicators.

15. The one or more non-transitory computer-readable storage media of claim 14, wherein computing the first plurality of deviation values comprises:
generating a first identification feature matrix based a plurality of metric values stored in a metric value database;
generating a smoothed matrix based on the first identification feature matrix and an anomaly identification model that includes a mapping from the first identification feature matrix to the smoothed matrix based on the one or more machine-learned expected variations; and
performing one or more subtraction operations between the first identification feature matrix and the smoothed matrix to generate the first plurality of deviation values.

16. The one or more non-transitory computer-readable storage media of claim 15, further comprising training a noise reducing autoencoder using a second identification feature matrix associated with one or more computer-based services to generate the anomaly identification model.

17. The one or more non-transitory computer-readable storage media of claim 14, wherein performing the one or more classification operations comprises:
generating a first plurality of interdependent inputs based on the first plurality of deviation values, wherein each interdependent input is associated with the first service and a plurality of metric values for multiple metric included in the plurality of metrics; and
for each interdependent input included in the first plurality of interdependent inputs, generating a different anomaly indicator included in the first plurality of anomaly indicators based on an anomaly model, wherein the anomaly model is based on the first set of machine-learned classification criteria associated with interdependencies between the multiple metrics.

18. The one or more non-transitory computer-readable storage media of claim 17, further comprising training an isolation forest using at least a second plurality of interdependent inputs and at least one expected percentage of anomalies to generate the anomaly model.

19. The one or more non-transitory computer-readable storage media of claim 14, wherein generating the first score comprises performing one or more weighted averaging operations on the first plurality of anomaly indicators.

20. The one or more non-transitory computer-readable storage media of claim 14, further comprising:
generating a first plurality of independent inputs based on the plurality of deviation values, wherein each independent input is associated with the first service and a first metric included in the plurality of metrics;

for each independent input included in the first plurality of independent inputs, generating a different anomaly indicator included in a second plurality of anomaly indicators based on an anomaly model, wherein the anomaly model includes a mapping of the independent input to the different anomaly indicator that is based on a second set of machine-learned classification criteria; and computing a second score that indicates a health of the first service with respect to the first metric based on the second plurality of anomaly indicators.

21. The one or more non-transitory computer-readable storage media of claim 20, further comprising training an isolation forest using at least a second plurality of independent inputs associated with the first metric and a third plurality of independent inputs associated with a second metric included in the plurality of metrics to generate the anomaly model.

22. The one or more non-transitory computer-readable storage media of claim 14, further comprising generating a graphical user interface that depicts the first score and a plurality of metric health scores associated with the plurality of metrics.

23. A system, comprising:
one or more memories storing instructions; and
one or more processors that are coupled to the one or more memories and, when executing the instructions, are configured to:
compute a first plurality of deviation values based on one or more machine-learned expected variations associated with a plurality of metrics, wherein the plurality of metrics is associated with a first service, and the one or more machine-learned expected variations are derived from one or more models trained via one or more machine learning operations;
perform one or more classification operations based on the first plurality of deviation values and a first set of machine-learned classification criteria to compute a first plurality of anomaly indicators associated with the first service; and
compute a first score that indicates the overall health of the first service based on the first plurality of anomaly indicators.

* * * * *